United States Patent Office 3,813,427
Patented May 28, 1974

---

3,813,427
CHRYSANTHEMIC ACID ESTERS
John Mervyn Osbond, Hatfield, and James Charles Wickens, St. Albans, England, assignors to Hoffmann-La Roche Inc., Nutley, N.J.
No Drawing. Continuation-in-part of abandoned application Ser. No. 117,147, Feb. 19, 1971. This application Sept. 28, 1971, Ser. No. 184,615
Claims priority, application Great Britain, Oct. 20, 1970, 49,737/70
Int. Cl. C07c 69/74
U.S. Cl. 260—468 H    11 Claims

ABSTRACT OF THE DISCLOSURE

Chrysanthemic acid esters of oxy or thio phenyl butynyl alcohols or phenyl pentynyl alcohols. The phenyl ring may include a chloro or lower alkyl substituent. The esters are useful as insecticides.

CROSS REFERENCE TO RELATED APPLICATIONS

This application is a continuation-in-part of applicants' copending application Ser. No. 117,147, filed Feb. 19, 1971, now abandoned.

SUMMARY OF THE INVENTION

In accordance with this invention, it has been found that compounds of the formula:

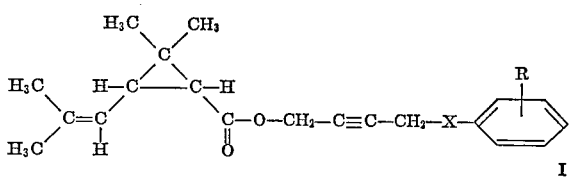

I wherein R is hydrogen, chlorine or lower alkyl and X is oxygen, sulfur or methylene;

are useful as insecticides.

The compounds of formula I are prepared by reacting an acid halide of the formula:

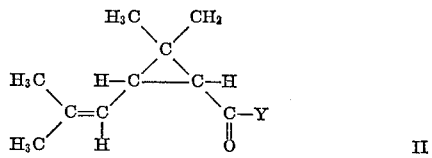

II wherein Y is chlorine or bromine;

with a phenyl alcohol of the formula:

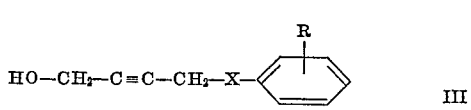

III wherein R and X are as above.

The compounds of formula I are also prepared by reacting a salt having the formula:

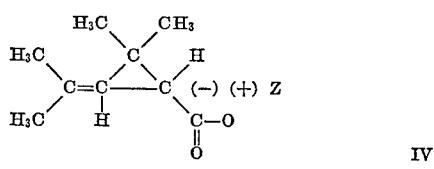

IV wherein Z is an alkali metal, silver or triloweralkylammonium;

with a compound of the formula:

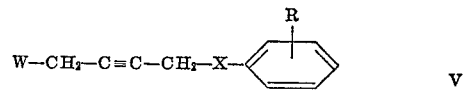

V wherein X and R are as above and W is halogen.

The compounds of formula I are further prepared by reacting a compound of the formula:

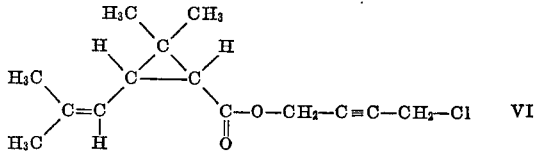

VI with a compound of the formula:

VII wherein R is as above and X' is oxygen or sulfur.

DETAILED DESCRIPTION OF THE INVENTION

The term "lower alkyl," as used throughout this application, comprehends both straight-chain and branched-chain saturated alkyl hydrocarbon groups containing from 1 to 6 carbon atoms such as methyl, ethyl, butyl, and isopropyl.

The term "halogen" or "halo," as used herein, when not expressly stated otherwise, includes all four halogens, i.e., bromine, chlorine, fluorine and iodine.

The term "triloweralkylammonium," as used herein, means the cation of the reaction salt of a carboxylic acid and a triloweralkylamine. By "triloweralkylamine," as just used, is meant that each of the three alkyl groups attached to the amine nitrogen is a "lower alkyl," as defined above. The term "triloweralkylammonium" includes cations such as triethylammonium and tri-isopropylammonium.

As mentioned above, the esters provided by this invention are useful as insecticides. They are active against a variety of insects (particularly against *Musca domestica*) and have been found to be particularly effective when they are synergized with well-known pyrethrin synergists such as piperonyl butoxide, (1,2-methylenedioxy)-4-[2-octylsulphinyl)-propyl]-benzene, bis (2,3,3,3-tetrachloropropyl)-ether and the like. Furthermore, these esters have been found to have a very low mammalian toxicity. For example, the compounds 4-(4-methyl-phenoxy)-2-butynyl (±)-*cis/trans*-2,2-dimethyl-3-(2-methyl-propenyl)-*cyclo*propane carboxylate;
4-(4-chloro-phenoxy)-2-butynyl (±)-*cis/trans*-2,2-dimethyl-3-(2-methyl-propenyl)-*cyclo*propane carboxylate;
4-phenylthio-2-butynyl (±)-*cis/trans*-2,2-dimethyl-3-(2-methyl-propenyl)-*cyclo*propane carboxylate; and
4-phenoxy-2-butynyl (±)-*cis/trans*-2,2-dimethyl-3-(2-methyl-propenyl)-*cyclo*propane carboxylate have an $LD_{50}$ of 1600 mg./kg. *per os* in mice and have been shown to have an activity against *Musca domestica* in the order of pyrethrin extract and DDT. These esters also show an activity against bean aphids and codlin moth.

The esters of the invention can be used in the form of insecticidal compositions which contain them in association with a compatible carrier material. Such insecticidal compositions can be made up in liquid form (e.g. as a sprayable solution or suspension) or in solid form (e.g. as a dust or granulate), either of which includes therewith a compatible carrier. The term "compatible carrier" is used in this specification to mean a substance which is inert towards the esters of formula I, which can be used to dissolve, disperse or diffuse the esters without impairing the effectiveness thereof and which does not permanently damage the environment to which it is applied (e.g. crops, soil, equipment, etc.). For example, liquid compositions can be extended with water and dusts and granulates can be extended with inert solid carriers. Where a solid carrier is used in the preparation of insecticidal compositions, the carrier may be talc, finely powdered clay, silica or any similar carrier which does not bring about decomposition of the esters. Where the esters of formula I are formulated into liquid compositions, such compositions can include emulsifiers and/or acceptable organic solvents. If desired, the compositions can also contain conventional additives such as wetting agents or the like, as well as other insecticidally-active compounds and/or synergists.

An effective amount of an insecticidal composition can be applied to an insect-infested area using any conventionally accepted method such as spraying, dusting, etc. Desirably, solid compositions and liquid compositions contain from about 0.5% to 25% (preferably from about 1% to 10%) by weight of an ester of formula I. The choice of concentration of an ester of formula I and the rate of application to the insect-infested area will, of course, depend on several factors; for example, the type and maturity of insects present, the type of composition applied and the mode of application.

It will be appreciated that the insecticidal compositions can take the form of concentrates (e.g. wettable powders or emulsion concentrates) suitable for storage and containing, for example, from about 10% to 80% by weight of an ester of formula I. The concentrates can be diluted with the same or a different carrier to a concentration suitable for application to an insect-infested area. Emulsion concentrates can be prepared, for example, by dissolving an ester of formula I in an acceptable organic solvent and adding an emulsifier which is soluble in the organic solvent.

Any organic solvent can be used including hydrocarbons (e.g. toluene and xylene), chlorinated hydrocarbons (e.g. perchloroethylene), ketones, esters, etc. or mixtures thereof. Preferably, the solvent should be water immiscible and the especially preferred solvents are aromatic hydrocarbons and ketones.

Surfactants are useful as emulsifiers, and when used, they suitably constitute from about 5% to 15% by weight of an emulsion concentrate. Preferably, the surfactants should be non-ionic.

In accordance with this invention, among the preferred compounds of formula I are the esters having the formula:

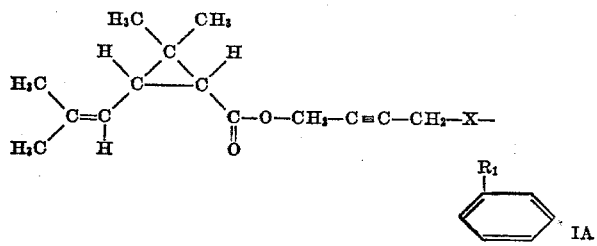

IA wherein $R_1$ is hydrogen or lower-alkyl and X is oxygen, sulfur or methylene.

Especially preferred are the compounds of formula IA wherein X is oxygen, particularly 4-phenoxy-2-butynyl (±)-cis/trans - 2,2 - dimethyl-3-(2-methyl-propenyl)-cyclopropane carboxylate and 4-(2-methylphenoxy)-2-butynyl (±)-cis/trans-2,2-dimethyl-3-(2-methylpropenyl)-cyclopropane carboxylate.

Also among the preferred compounds of formula I, in accordance with this invention, are the esters having the formula:

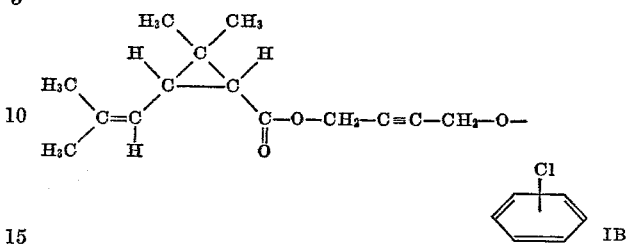

IB particularly, 4 - (4-chloro-phenoxy)-2-butynyl (±)-cis/trans-2,2-dimethyl-3-(2 - methyl-propenyl)-cyclopropane carboxylate.

Further among the preferred compounds of formula I, in accordance with this invention, are the esters having the formula:

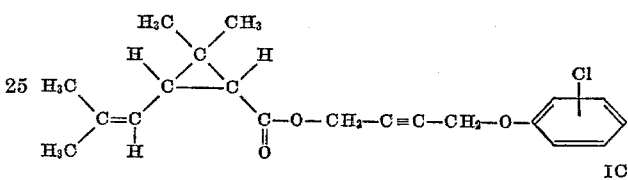

IC where $R_1$ is as above;

particularly 4 - (4-methyl-phenoxy)-2-butynyl (±)-cis/trans-2,2-dimethyl-3-(2 - methyl-propenyl)-cyclopropane-carboxylate.

One method for preparing the compounds of formula I involves reacting an acid chloride or bromide of formula II with an alcohol of formula III.

The acid chloride and acid bromide starting materials of formula II are known substances and can be conveniently prepared by chlorinating or brominating the corresponding monocarboxylic acids (e.g. using thionyl chloride, phosphorus tribromide or the like). The acid chlorides are the more preferred starting materials of formula II.

The alcohol starting materials of formula III wherein X is oxygen or sulfur can be prepared, for example, by reacting a halobutynol of the formula:

$$W-CH_2-C\equiv C-CH_2-OH \qquad VIII$$

wherein W is a halogen, as above, preferably chlorine, with an alkali-metal salt of a phenol or thiophenol of formula VII hereinbefore, preferably a sodium salt. In carrying out this reaction, temperature and pressure are not critical, and this reaction can be carried out at room temperature (about 20° C.). Generally, it is preferred to carry out this reaction at an elevated temperature. A temperature of between 50° C. and 70° C. is especially preferred. The reaction can be carried out in any conventional, inert organic solvent, preferably a lower-alkanol, methanol and ethanol being especially preferred lower alkanols.

The alcohol starting materials of formula III, wherein X is methylene, can be prepared, for example, by a Grignard synthesis. In this synthesis, a compound of the formula:

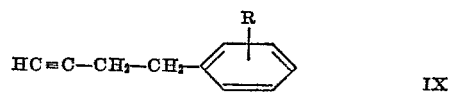

IX wherein R is as above;

is first reacted with a Grignard reagent—a loweralkylmagnesium halide, preferably ethylmagnesium bromide. The reaction is conveniently conducted under conventional conditions of temperature, pressure and absence of moisture. The resulting Grignard product is then reacted with formaldehyde in a conventional manner. The preferred reaction procedure involves passing gaseous formaldehyde through the Grignard product. The complex which results from the foregoing reaction with formaldehyde is then decomposed by conventional techniques, preferably by treatment with aqueous ammonium chloride, to yield the compound of formula III.

The reaction of an acid chloride or bromide starting material of formula II with an alcohol starting material of formula III is conveniently carried out in the presence of an acid-binding agent. In this reaction, any conventional acid-binding agent can be used. Among the preferred acid-binding agents are alkali-metal carbonates, such as sodium carbonate, alkali-metal bicarbonates, such as sodium bicarbonate, and tertiary organic amines, such as triethyl amine, pyridine and the like. An especially preferred acid-binding agent is pyridine. This reaction is conveniently carried out in the presence of an inert organic solvent. Any conventional inert organic solvent can be used. Among the preferred solvents, are included hydrocarbons, such as benzene, toluene or xylene, ethers such as diethyl ether or dioxane, and halogenated hydrocarbons, such as methylene chloride or chloroform or the like. In carrying out this reaction, temperature and pressure are not critical, and this reaction can be carried out at room temperature. Generally, it is preferred to carry out this reaction at a temperature within the approximate range of from 0° C. to 70° C., with about 20° C. being especially preferred. The reaction is also preferably carried out under the atmosphere of an inert gas. Any conventional inert gas may suitably be used, with nitrogen or argon being especially preferred.

Another method for preparing the compounds of formula I involves reacting the alkali-metal salt, the silver salt or the triloweralkylamine salt of a chrysanthemum monocarboxylic acid of formula IV with the halide of formula V.

The alkali-metal and triloweralkylamine salts of formula IV can be prepared, for example, by treating chrysanthemum monocarboxylic acid in an inert oganic solvent with a dilute aqueous alkali-metal hydroxide solution or a triloweralkylamine. In carrying out this reaction, any conventional inert organic solvent can be utilized which is compatible with the amine or with the hydroxide solution, as the case may be. Among the preferred solvents are the lower alkanols, with ethanol being especially preferred. In carrying out this reaction, any alkali-metal hydroxide or triloweralkylamine can be utilized. Among the preferred hydroxides and amines are the sodium and potassium hydroxides and triethylamine. In carrying out this reaction, the temperature and pressure are not critical, and the reaction can be carried out at room temperature.

The silver salts of formula IV can be prepared by treating an alkali-metal salt of formula IV, such as the sodium salt, in an aqueous solution with silver nitrate. In carrying out this reaction the temperature and pressure are not critical, and the reaction can be carried out at room temperature.

The halide starting materials of formula V wherein X is oxygen or sulfur can be prepared, for example, by reacting a dihalobutyne of the formula:

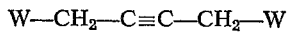

$$W-CH_2-C\equiv C-CH_2-W \qquad X$$

wherein W is as above, preferably, 1,4-dichloro-2-butyne, with an alkali-metal salt of a phenol or thiophenol of formula VII. The reaction is suitably carried out in an inert organic solvent. Any conventional inert organic solvent can be used, but a lower alkanol is preferred, and methanol and ethanol are especially preferred. Although tempertaure and pressure are not critical, an elevated temperature is preferred for this reaction, a temperature of from 50° C. to 70° C. being especially preferred.

The halide starting materials of formula V wherein X is methylene can be prepared, for example, by treating an alcohol starting material of formula III, wherein X is methylene, with a halogenating agent. Any conventional halogenating agent can be utilized in this reaction, but thionyl chloride and phosphorus tribromide are preferred.

The reaction of an alkali-metal salt, a silver salt or a triloweralkylamine salt of a chrysanthemum monocarboxylic acid, of formula IV, with a halide of formula V is suitably carried out in an inert organic solvent. Any inert organic solvent can be used, but it is preferred to use a ketone with acetone, methyl ethyl ketone or diglyme being especially preferred. Although temperature and pressure are not critical, the reaction is preferably carried out at an elevated temperature, the reflux temperature of the reaction mixture being especially preferred. It is also preferred to carry out the reaction under the atmosphere of an inert gas. Although the selection of the inert gas is not critical, nitrogen or argon are especially preferred.

Still another method for preparing the compounds of formula I involves reacting a compound of formula VI with an alkali-metal salt of a phenol or thiophenol of formula VII.

The starting materials of formula VI can be prepared, for example, by reacting an acid chloride or bromide of formula II with 4-chloro-2-butyn-1-ol. This reaction can be carried out under similar conditions to those described earlier in connection with the reaction of an acid chloride or bromide starting material of formula II with an alcohol starting material of formula III.

The alkali-metal salts of the phenols and thiophenols of formula VII are known and can be prepared by conventional methods.

The reaction of a starting compound of formula VI with an alkali-metal salt of a phenol or thiophenol of formula VII can suitably be carried out in the presence of an inert organic solvent. Any inert organic solvent such as a hydrocarbon, a halogenated hydrocarbon, and the like can be used. Benzene, toluene, and xylene, are the preferred hydrocarbons, and chloroform and methylene chloride are the preferred halogenated hydrocarbons. In carrying out this reaction, temperature and pressure are not critical. Generally, it is preferred to carry out the reaction at an elevated temperature, with reflux temperatures being especially preferred. Also, it is convenient to carry out the reaction under the atmosphere of an inert gas. Among the preferred inert gases are nitrogen or argon.

It will be appreciated that the chrysanthemic acid moiety in formula I can show both geometric isomerism and optical isomerism. It will accordingly be understood that the esters provided by this invention include all of the various geometrical and optical isomers as well as mixtures thereof. One type of mixture is obtained by using an acid chloride or bromide starting material mixture, an alkali-metal salt starting material mixture, a silver salt starting material mixture, a triloweralkylamine salt starting material mixture or a starting material mixture of formula VI obtained from a commercial chrysanthemum monocarboxylic acid which is a racemic cis/trans mixture containing a cis/trans ratio of ca 30:70 parts by weight.

The following examples illustrate the compounds of the invention. The chrysanthemum monocarboxylic acid mentioned therein is the commercial (±) carboxylic acid consisting of a cis/trans mixture in the ratio of ca 30:70 parts by weight. The chrysanthemum monocarboxylic acid chloride mentioned in the examples was obtained from the same acid. All temperatures are in degrees centigrade. Unless otherwise stated, hydrochloric acid, sodium hydroxide solution and sodium bicarbonate solution are aqueous solutions. Brine is an aqueous solution of 20 parts by weight of sodium chloride per 100 parts by weight of water. Diethyl ether is referred to as "ether,"

and the term "acidified" refers to treatment with dilute hydrochloric acid.

EXAMPLE 1

To a stirred solution of 8.9 g. of 4-phenylthio-2-butyn-1-ol and 8 ml. of dry pyridine in 70 ml. of dry benzene was added over a period of 0.25 hours under a nitrogen atmosphere, a solution of 9.3 g. of chrysanthemum monocarboxylic acid chloride in 10 ml. of benzene. The resulting mixture was stirred at 20° C. for 16 hours, and then, precipitated pyridine hydrochloride was filtered off. The filtrate was successively washed with 2-N hydrochloric acid, 2-N aqueous sodium hydroxide solution, 2-N hydrochloric acid, saturated aqueous sodium bicarbonate solution and brine, dried over anhydrous sodium sulphate, filtered and evaporated. The residue was distilled to give 9.7 g. of 4-phenylthio-2-butynyl ($\pm$)-cis/trans - 2,2 - dimethyl - 3 - (2-methyl-propenyl)-cyclopropane carboxylate. B.P. 154°–164° C./0.05–0.1 mm. Hg; $n_D^{20}$=1.5526.

EXAMPLE 2

A solution of 75.6 g. of chrysanthemic acid in 250 ml. of ethanol was titrated against 2-N aqueous sodium hydroxide solution until neutral. The resulting solution was evaporated to dryness. Ethanol was added to the residue and again distilled off. The residue thus obtained was repeatedly codistilled with benzene until its weight corresponded to the theoretical yield of the sodium chrysanthemum conocarboxylate. The residue was then added to 2 liters of diglyme and the mixture was stirred and heated at 100° C. under a nitrogen atmosphere while 81 g. of 1-chloro - 4 - phenoxy - 2 - butyne was added thereto over a period of 0.5 hours. The resulting mixture was stirred at 150° C. (oil-bath temperature) for 5 days. Precipitated sodium chloride was then filtered off and the filtrate was evaporated under reduced pressure. The residual syrup was dissolved in diethyl ether and the solution was washed twice with 2-N aqueous sodium hydroxide solution. The aqueous wash liquid was back-extracted with diethyl ether and the combined ethereal solutions were successively washed with water, saturated aqueous sodium bicarbonate solution asd brine, dried over anhydrous sodium sulphate, filtered and evaporated. The residue was distilled at the oil pump under a nitrogen atmosphere in the presence of a trace of hydroquinone to give 4 - phenoxy - 2 - butynyl ($\pm$)-cis/trans - 2,2 - dimethyl - 3 - (2-methyl-propenyl)-cyclopropane carboxylate. B.P. 160°–180° C./0.25 mm. Hg; (bath temperature=200°–205° C.) in ca 50% yield. Unreacted 1-chloro-4-phenoxy-2-butyne was also recovered.

EXAMPLE 3

To a solution of 14.5 g. of 4-(2-methyl-phenoxy)-2-butyn-1-ol and 12 ml. of dry pyridine in 100 ml. of dry benzene was added, over a period of 0.25 hours, a solution of 14 g. chrysanthemum monocarboxylic acid chloride in 40 ml. of benzene. The resulting mixture was stirred in a nitrogen atmosphere at 20° C. for 16 hours, and then, precipitated pyridine hydrochloride was filtered off and washed with benzene. The combined washings and filtrate were successively washed twice with 5-N hydrochloric acid, twice with 2-N aqueous sodium hydroxide solution, once with 2-N hydrochloric acid, twice with saturated aqueous sodium bicarbonate solution and twice with brine, dried over anhydrous sodium sulphate, filtered and evaporated. The residual syrup (25 g.) was chromatographed on 100 g. of neutral alumina using petroleum ether (boiling range=40°–60° C.) as the eluting agent. Evaporation of the eluate gave 15 g. of analytically pure 4 - (2 - methyl-phenoxy) - 2 - butynyl ($\pm$) - cis/trans - 2,2 - dimethyl - 3 - (2 - methyl-propenyl)-cyclopropane carboxylate; $n_D^{20}$=1.5290.

EXAMPLE 4

To a stirred solution of 8 g. of 5-phenyl-2-pentyl-1-ol and 8 ml. of dry pyridine in 100 ml. of dry benzene was added, over a period of 0.5 hours, under a nitrogen atmosphere, a solution of 9.3 g. of chrysanthemum monocarboxylic acid chloride in 10 ml. of dry benzene. The resulting mixture was stirred at 20° C. for 20 hours, and then, precipitated pyridine hydrochloride was filtered off. The filtrate was successively washed once with an aqueous solution containing 20% by weight of hydrochloric acid, once with 2-N hydrochloric acid, twice with 2-N sodium hydroxide solution, once with 2-N hydrochloric acid, twice with saturated sodium bicarbonate solution and twice with brine, dried over anhydrous sodium sulphate, filtered and evaporated. The residual syrup was chromatographed on alumina using petroleum ether (boiling range=40°–60° C.) as the eluting agent. Evaporation of the eluate gave 10.8 g. of 5-phenyl-2-pentynyl ($\pm$)-cis/trans - 2,2 - dimethyl - 3 - (2 - methyl-propenyl)-cyclopropane carboxylate; $n_D^{20}$=1.5290.

EXAMPLE 5

To a solution of 8.6 g. of 4-chloro-2-butyn-1-ol and 11.85 g. of dry pyridine in 120 ml. of dry benzene was added, over a period of 0.5 hours, under a nitrogen atmosphere at room temperature, a solution of 14 g. of chrysanthemic acid chloride in 50 ml. of benzene. The resulting mixture was stirred at 25° C. for 19 hours, and then, precipitated pyridine hydrochloride was filtered off and washed with benzene. The combined washings and filtrate were successively washed twice with 2-N hydrochloric acid, once with 2-N aqueous sodium hydroxide solution, once with 2-N hydrochloric acid, twice with saturated aqueous sodium bicarbonate solution and twice with brine, dried over anhydrous sodium sulphate, filtered and evaporated. The residue was distilled to give 15.3 g. of 4-chloro-2-butynyl ($\pm$)- cis/trans - 2,2-dimethyl-3-(2-methyl-propenyl)cyclopropane carboxylate of boiling point 120°–122° C./0.45 mm. Hg; $n_D^{20}$=1.5010.

EXAMPLE 6

2.3 g. of sodium were dissolved in 400 ml. of dry ethanol. A solution of 12.9 g. of 4-chloro-phenyl in 60 ml. of dry ethanol was added and the resulting mixture was stirred at 20° C. for 0.5 hour. The mixture was then evaporated to dryness under reduced pressure and the residue was codistilled with benzene to yield the sodium salt of 4-chloro-phenol. This salt was powdered and suspended in 1 litre of dry benzene. 25.5 g. of 4-chloro-2-butynyl ($\pm$)-cis/trans - 2,2 - dimethyl - 3 - (2 - methylpropenyl)cyclopropane carboxylate were added to the suspension and the resulting mixture was stirred under reflux in a nitrogen atmosphere for 40 hours, cooled and evaporated under reduced pressure. The residue was treated with water, then acidified and extracted three times with ether. The combined extracts were washed three times with dilute sodium hydroxide solution and twice with brine, dried over anhydrous sodium sulphate, filtered, evaporated and distilled. High vacuum distillation of the residue through a Vigreux column yielded a main fraction (11.6 g.) of 4-(4-chlorophenoxy) - 2 - butynyl ($\pm$) - cis/trans - 2,2 - dimethyl - 3 - (2 - methylpropenyl)-cyclopropane carboxylate boiling at 150°–158° C./10$^{-4}$ mm.

EXAMPLE 7

0.57 g. of sodium were dissolved in 50 ml. of dry ethanol over a period of 0.5 hour. 2.7 g. of p-cresol were added and the mixture was left at room temperature overnight. It was then evaporated to give the white solid sodium salt of p-cresol which was codistilled twice with benzene. This salt was dissolved in 100 ml. of dry diglyme and treated with 6.48 g. of 4-chloro-2-butynyl ($\pm$)-cis/trans - 2,2 - dimethyl - 3 - (2-methyl-propenyl)-cyclopropane carboxylate. The mixture thus obtained was stirred under a nitrogen atmosphere in an oil-bath at 100° C.–110° C. for 120 hours. The diglyme was removed by evaporation and the residue treated with water acidified with dilute hydrochloric acid and extracted three times with ether. The combined ether solutions were washed twice with 2-N aqueous sodium hydroxide solution, twice with brine, dried over anhydrous sodium sulphate, filtered and evaporated to give a syrup. Distillation of the syrup under a high vacuum yielded 5.2 g. of 4-(4-methyl-phenyl) - 2 - butynyl ($\pm$)-*cis/trans*-2,2-dimethyl-3-(2-methyl-propenyl)cyclopropane carboxylate of boiling point 130° C.–141° C./10$^{-4}$ mm.; $n_D^{20}$=1.5247.

EXAMPLE 8

0.46 g. of sodium was dissolved in 100 ml. of dry ethanol. A solution of 2.2 g. of thiophenol in 30 ml. of dry ethanol was added, and the resulting mixture was stirred at 20° C. for 0.5 hour, and then, evaporated to dryness *in vacuo*. The residue was codistilled three times with benzene to yield the sodium salt of thiophenol as a white solid. This was powdered and suspended in 200 ml. of dry benzene. 5.12 g. of 4-chloro-2-butynyl ($\pm$)-*cis/trans*-2,2-dimethyl-3-(2-methyl propenyl) *cyclo*propane carboxylate was added to the suspension and the resulting mixture was stirred for 16 hours at 80° C., cooled and evaporated *in vacuo*. The residue was treated with water, then acidified and extracted three times with diethyl ether. The combined extracts were washed three times with 2-N sodium hydroxide solution and twice with brine, dried over anhydrous sodium sulphate, filtered and evaporated to leave 5.2 g. of 4-phenylthio-2-butynyl ($\pm$)-*cis/trans*-2,2-dimethyl-3-(2-methyl-propenyl)-*cyclo*propane carboxylate as a syrup.

EXAMPLE 9

To a stirred solution of 14.74 g. of 4-(4-chloro-phenoxy)-2-butyn-1-ol and 12 ml. of dry pyridine in 100 ml. of dry benzene was added, in a nitrogen atmosphere over a period of 0.25 hours, a solution of 14 g. of chrysanthemum monocarboxylic acid chloride in 50 ml. of dry benzene. The resulting mixture was stirred at 20° C. for 16 hours. Precipitated pyridine hydrochloride was then filtered off and the filtrate was successively washed twice with 2-N hydrochloric acid, twice with 2-N aqueous sodium hydroxide solution, once with 2-N hydrochloric acid, twice with saturated aqueous sodium bicarbonate solution and twice with brine, dried over anhydrous sodium sulphate, filtered and evaporated. The residual syrup was chromatographed on alumina using petroleum ether (boiling range=40°–60° C.). Evaporation of the eluates gave 19.8 g. of 4(4-chloro-phenoxy)-2-butynyl ($\pm$)-*cis/trans*-2 - 2-dimethyl-3 - (2 - methyl-propenyl)-*cyclo*propane carboxylate; $n_D^{20}$=1.5357.

EXAMPLE 10

By utilizing the procedure of Example 7, 4-(2-chloro-phenoxy) - 2 - butynyl $\pm$-*cis/trans*-2,2-dimethyl-3-(2-methyl-propenyl)-*cyclo*-propane carboxylate was obtained in 79% yield from 4 - (2-chloro-phenoxy)-2-butyn-1-ol and chrysanthemum monocarboxylic acid chloride. The ester was purified by distillation in oil diffusion pump vacuum and had a boiling point of 155°–165° C./10$^{-5}$ mm. Hg. The ester was obtained in the form of a colorless oil; $n_D^{20}$=1.5405.

EXAMPLE 11

By utilizing the procedure of Example 1, from 4-(3-chloro-phenoxy)-2-butyn-1-ol and chrysanthemum monocarboxylic acid chloride there was obtained 4-(3-chloro-phenoxy)-2-butynyl ($\pm$)-*cis/trans*-2,2-dimethyl - 3 - (2-methyl-propenyl)-*cyclo*propane carboxylate in the form of a colorless oil; $n_D^{20}$=1.5304.

EXAMPLE 12

A solution of 25.2 g. of chrysanthemic acid in 100 ml. of ethanol was titrated against 2-N aqueous sodium hydroxide solution until neutral. The resulting solution was evaporated to dryness. Ethanol was added to the residue and again distilled off. The residue thus obtained was repeatedly codistilled with benzene until its weight corresponded to the theoretical yield of the sodium chrysanthemum monocarboxylate. The residue was then added to 900 ml. of diglyme and the mixture was stirred and heated at 100° C. under a nitrogen atmosphere while 32.3 g. of 1-chloro-4-(4-chloro-phenoxy)-2-butyne were added thereto over a period of 0.5 hour. The resulting mixture was stirred at 150° C. (oil-bath temperature) for 5 days. Precipitated sodium chloride was then filtered off and the filtrate was evaporated under reduced pressure. The residual syrup was dissolved in diethyl ether and hte solu- was washed twice with 2–N aqueous sodium hydroxide solution. The aqueous wash liquid was back-extracted with diethyl ether and the combined ethereal solutions were successively washed with water, saturated aqueous sodium bicarbonate solution and brine, dried over anhydrous sodium sulphate, filtered and evaporated. The residue was distilled at the oil pump under a nitrogen atmosphere in the presence of a trace of hydroquinone to give 4-(4-chloro-phenoxy)-2 - butynyl $\pm$-*cis-trans* - 2,2-dimethyl-3-(2-methyl-propenyl)-cyclopropane carboxylate of boiling point 145°–156° C./10$^{-4}$ mm. (bath temperature about about 200° C.) in about 46% yield.

EXAMPLE 13

A solution of 21.6 g. of p-cresol in 100 ml. of ethanol was added over a period of 0.25 hour with stirring under a nitrogen atmosphere to a sodium ethoxide solution prepared from 4.6 g. of sodium and 100 ml. of ethanol. 20.9 g. of 4-chloro-2-butyn-1-ol were subsequently added to the resulting mixture over a period of 0.5 hour. The mixture obtained was stirred while heating under gentle reflux in a nitrogen atmosphere for 60 hours, and then ethanol was evaporated off under reduced pressure. The residue was added to water, acidified with dilute hydrochloric acid and extracted with three 200 ml. portions of ether. The combined ether extracts were washed twice with 2-N aqueous sodium hydroxide solution and twice with brine, dried over anhydrous sodium sulphate and evaporated. Distillation of the residue at oil-pump vacuum gave 31.7 g. of 4-(4-methyl-phenoxy)-2-butyn-1-ol as a yellow syrup; $n_D^{20}$=1.5491.

EXAMPLE 14

A solution of 9.3 g. of chrysanthemum monocarboxylic acid chloride in 20 ml. of dry benzene was aded dropwise over 0.5 hour at 20° C. under a nitrogen atmosphere to a stirred solution of 8.8 g. of 4-(4-methyl-phenoxy)-2-butyn-1-ol and 8 ml. of dry pyridine in 100 ml. of dry benzene. The resulting mixture was stirred for a further 16 hours, and then precipitated pyridine hydrochloride was filtered off and washed with benzene. The combined washings and filtrate were washed twice with 5-N aqueous hydrochloric acid, twice with 2-N aqueous sodium hydroxide solution, once with 1-N aqueous hydrochloric acid, twice with saturated aqueous sodium bicarbonate solution and twice with brine, dried over anhydrous sodium sulphate, filtered and evaporated. The residual yellow syrup was chromatographed on neutral alumina to yield 12 g. of pure 4-(4-methyl-phenoxy)-2-butynyl$\pm$-*cis/trans*-2,2-dimethyl-3-(2-methyl-propenyl)-*cyclo*propane carboxylate as a colorless liquid; $n_D^{20}$=1.5250.

EXAMPLE 15

9.5 g. of sodium chrysanthemum monocarboxylate were suspended in 250 ml. of dry diglyme. The resulting suspension was heated in an oil-bath at 140° C. under a nitrogen atmosphere while 9.7 g. of 1-chloro-4-(4-methyl-phenoxy)-2-butyne were added over a period of 0.5 hour. The resulting mixture was stirred for 156 hours at 140° C. The diglyme was removed under reduced pressure and water was added to the residue. This aqueous mixture was extracted three times with ether, the combined ether extracts were washed three times with 2-N aqueous sodium hydroxide solution and twice with brine, dried over anhydrous sodium sulphate, filtered and evaporated to give 15.9 g. of crude product in the form of a syrup. This syrup was chromatographed on 80 g. of neutral alumina to yield, after elution with petroleum ether (boiling range 40° C.–60° C.) and evaporation, 9.3 g. of pure 4 - (4-methyl-phenoxy)-2-butynyl (±) - cis/trans-2,2-dimethyl-3 - (2 - methyl - propenyl) - cyclopropane carboxylate; $n_D^{20}$=1.5260.

The following examples are illustrative of insecticidal compositions containing the esters of the invention.

EXAMPLE 16

2.5 g. of 4-phenoxy-2-butynyl (±)-cis/trans - 2,2 - dimethyl-3-(2-methyl-propenyl) - cyclopropane carboxylate was dissolved in sufficient kerosene to give a final volume of 100 ml. The resulting solution was suitable for use as a spray.

EXAMPLE 17

20 g. of 4-phenoxy-2-butynyl (±)-cis/trans - 2,2 - dimethyl-3-(2-methyl-propenyl)-cyclopropane carboxylate, 10 g. of nonoxylon-15 (a non-ionic surfactant) and 70 g. of xylene were thoroughly mixed to give a solution which could be used as an emulsifiable concentrate. Before use, the emulsifiable concentrate was emulsified in sufficient water to give a ten-fold dilution.

EXAMPLE 18

2.5 g. of 4-phenoxy-2-butynyl (±)-cis/trans - 2,2 - dimethyl-3-(2-methyl-propenyl) - cyclopropane carboxylate was dissolved in 20 ml. of acetone. 97.5 g. of 300-mesh diatomaceous earth added to the solution and the resulting mixture was thoroughly stirred in a mortar. Acetone was then evaporated off to give a 2.5% dust formulation.

EXAMPLE 19

2.5 g. of 4-(4-chloro-phenoxy) - 2 - butynyl (±)-cis/trans-2,2-dimethyl - 3 - (2 - methyl-propenyl)-cyclopropane carboxylate was dissolved in sufficient kerosene to give a final volume of 100 ml. The resulting solution was suitable for use as a spray.

EXAMPLE 20

5 g. of 4-(4-chloro-phenoxy)-2-butynyl (±)-cis/trans-2,2-dimethyl - 3 - (2-methyl-propenyl)-cyclopropane carboxylate was well mixed with 5 g. of lignin sulphonate and 90 g. of kaolin. The mixture was thoroughly stirred in a mortar while 10 ml. of water were added, and then, the moist mixture was further stirred and subsequently granulated in a granulator. After drying in air, there were obtained granules containing 5% of active ingredient.

EXAMPLE 21

20 g. of 4-(4-chloro-phenoxy)-2-butynyl (±)-cis/trans-2,2-dimethyl - 3 - (2-methyl-propenyl)-cyclopropane carboxylate, 10 g. of nonoxylon-15 (a non-ionic surfactant) and 70 g. of xylene were thoroughly mixed to give a solution which could be used as an emulsifiable concentrate. Before use, the emulsifiable concentrate was emulsified in sufficient water to give a ten-fold dilution.

EXAMPLE 22

2.5 g. of 4-(4-methyl-phenoxy) - 2 - butynyl (±)-cis/trans-2,2-dimethyl-3-(2-methyl-propenyl) - cyclopropane carboxylate were dissolved in sufficient kerosene to give a final volume of 100 ml. The resulting solution was suitable for use as a spray.

EXAMPLE 23

5 g. of 4-(4-methyl-phenoxy)-2-butynyl (±)-cis/trans-2,2-dimethyl - 3 - (2-methyl-propenyl)-cyclopropane carboxylate were thoroughly mixed with 5 g. of lignin sulphonate and 90 g. of kaolin. The mixture was thoroughly stirred in a mortar while 10 ml. of water were added. The moist mass was then further stirred and subsequently granulated. After drying in air, granules containing 5 g. by weight of active ingredient were obtained.

EXAMPLE 24

20.0 g. of 4-(4-methyl-phenoxy) - 2 - butynyl (±)-cis/trans-2,2-dimethyl-3-(2-methyl-propenyl) - cyclopropane carboxylate were thoroughly mixed with 10.0 g. of nonoxylon-15 (a non-ionic surfactant) and 70.0 g. of xylene. This yielded a solution which can be used as an emulsifiable concentrate. Before use, the solution is emulsified in sufficient water to give a ten-fold dilution.

What is claimed is:

1. A compound of the formula:

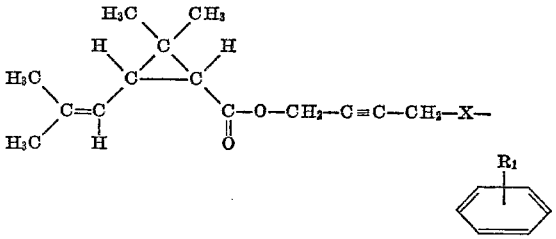

wherein R is hydrogen, lower alkyl or chlorine and X is oxygen or sulfur.

2. The compound of claim 1 wherein X is oxygen.
3. The compound of claim 2 wherein R is chlorine.
4. The compound of claim 3 wherein said compound is 4-(4-chloro-phenoxy)-2-butynyl (±)-cis/trans-2,2-dimethyl-3-(2-methylpropenyl)-cyclopropane carboxylate.
5. The compound of claim 2 wherein R is lower alkyl.
6. The compound of claim 5 wherein said compound is 4-(2-methyl-phenoxy)-2-butynyl (±)-cis/trans-2,2-dimethyl-3-(2-methylpropenyl)-cyclopropane carboxylate.
7. The compound of claim 5 wherein said compound is 4-(4-methyl-phenoxy)-2-butynyl (±)-cis/trans-2,2-dimethyl-3-(2-methyl-propenyl)-cyclopropane carboxylate.
8. The compound of claim 2 wherein R is hydrogen.
9. The compound of claim 8 wherein said compound is 4-phenoxy - 2 - butynyl (±)-cis/trans-2,2-dimethyl-3-(2-methyl-propenyl)-cyclopropane carboxylate.
10. The compound of claim 1 wherein X is sulfur.
11. The compound of claim 10 wherein said compound is 4-phenyl-thio-2-butynyl (±)-cis/trans-2,2-dimethyl-3-(2-methyl-propenyl)-cyclopropane carboxylate.

References Cited

FOREIGN PATENTS 2,000,636   7/1970   Germany _____ 260—468

LORRAINE A. WEINBERGER, Primary Examiner
R. GERSTL, Assistant Examiner

U.S. Cl. X.R.
424—306

UNITED STATES PATENT OFFICE
CERTIFICATE OF CORRECTION

PATENT NO. : 3,813,427
DATED : May 28, 1974
INVENTOR(S) : JOHN MERVYN OSBOND AND JAMES CHARLES WICKENS

It is certified that error appears in the above-identified patent and that said Letters Patent are hereby corrected as shown below:

In claim 1, col. 12, lines 24-34

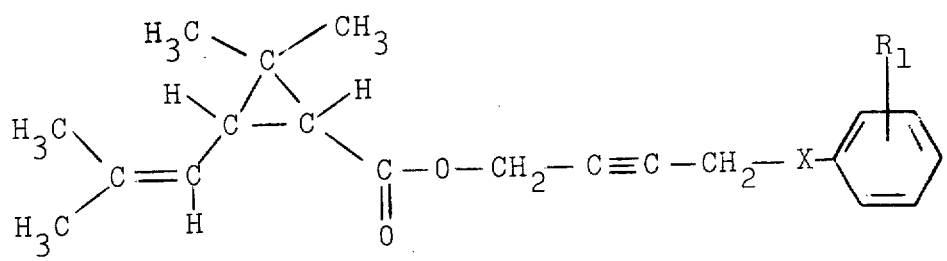

should be

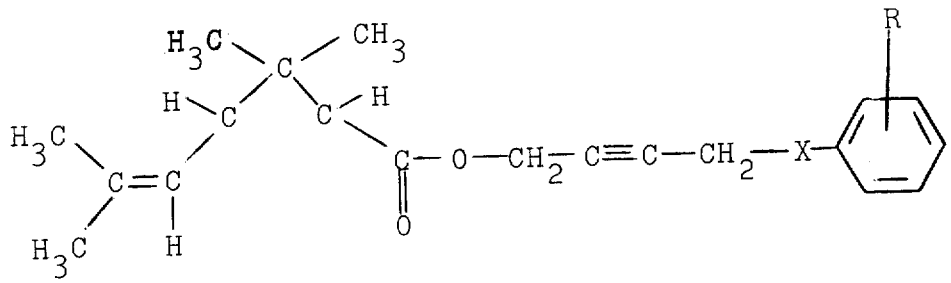

Signed and Sealed this twenty-fifth Day of November 1975

[SEAL]

Attest:

RUTH C. MASON
Attesting Officer

C. MARSHALL DANN
Commissioner of Patents and Trademarks